(No Model.)
J. H. THOMAS.
HORSE HAY RAKE.
No. 317,594. Patented May 12, 1885.
2 Sheets—Sheet 1.
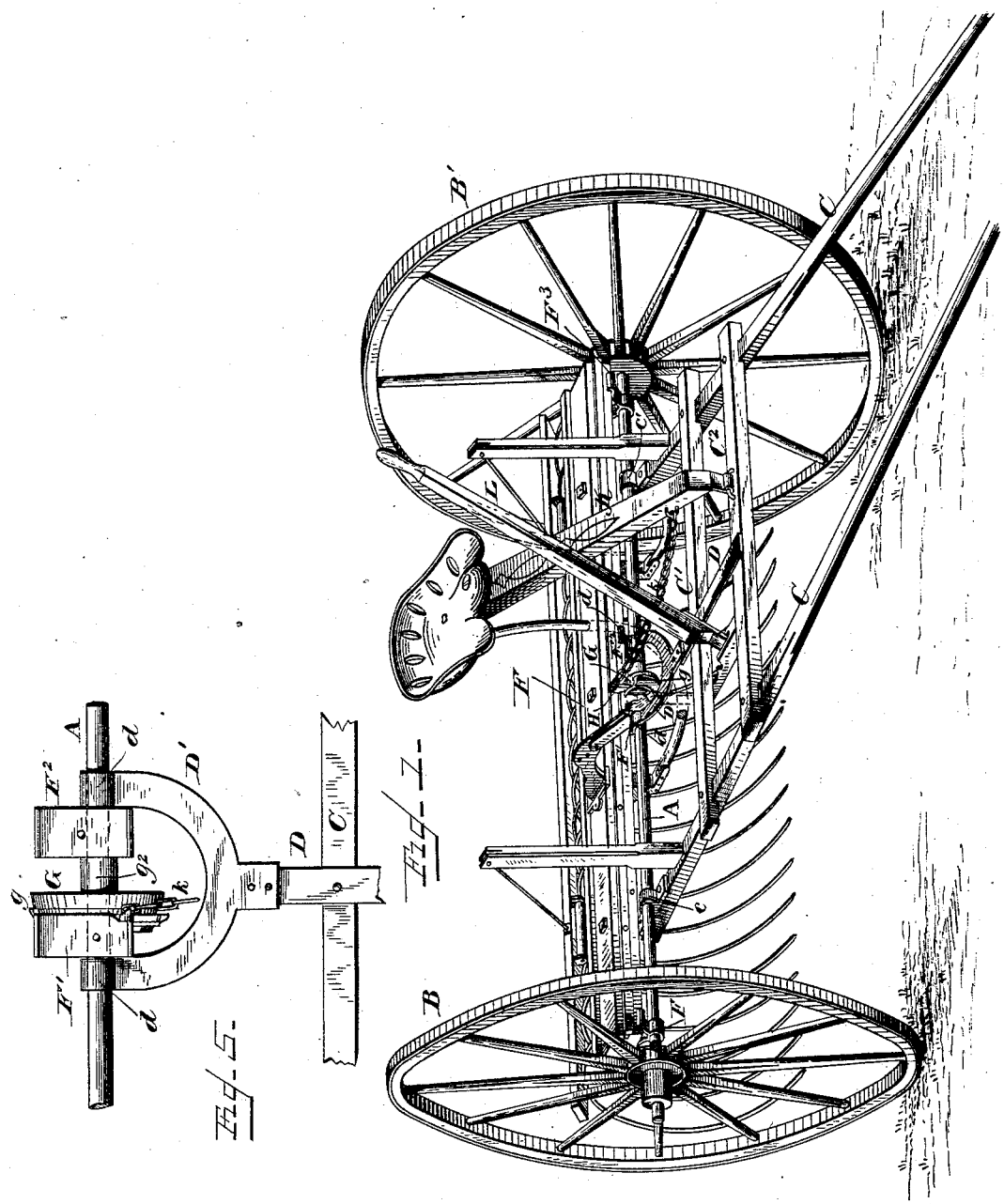
WITNESSES
F. L. Ourand
Geo. K. Rundel
INVENTOR
John H. Thomas
by A. M. Smith
Attorney (No Model.) 2 Sheets—Sheet 2.
J. H. THOMAS.
HORSE HAY RAKE.
No. 317,594. Patented May 12, 1885.
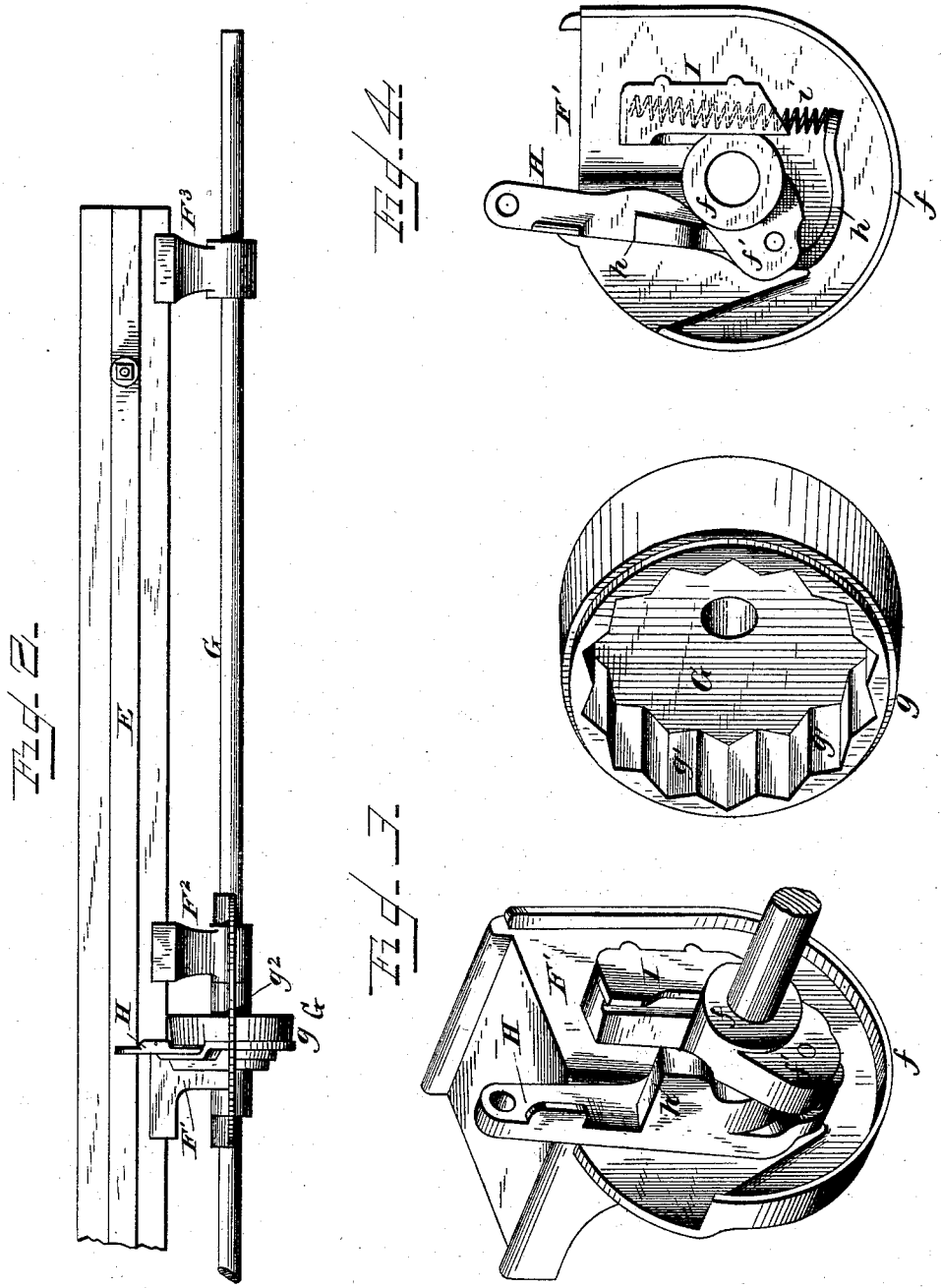
WITNESSES
F. L. Ourand
Geo. H. Rendel
INVENTOR
John H. Thomas
by A. H. Smith
Attorney

UNITED STATES PATENT OFFICE.

JOHN H. THOMAS, OF SPRINGFIELD, OHIO.

HORSE HAY-RAKE.

SPECIFICATION forming part of Letters Patent No. 317,594, dated May 12, 1885.

Application filed May 31, 1884. (No model.)

*To all whom it may concern:*

Be it known that I, JOHN H. THOMAS, of Springfield, county of Clark, and State of Ohio, have invented a new and useful Improvement in Horse Hay-Rakes, of which the following is a full, clear, and exact description, reference being had to the accompanying drawings, making part of this specification.

My invention relates to an arrangement of pawl-arm, and spring for retracting the pawl, which engages with the internally-ratcheted rim on the axle for rocking the rake upward to discharge its load, and to the means for preventing lateral play or movement of the thills on the axle, and for tripping or releasing the rake after it has been rocked upward to discharge the load, and will be understood from the following description, reference being had to the drawings, in which—

Figure 1 is a perspective view of a rake with my improvements applied. Fig. 2 is a front elevation of a portion of the axle and rake-head with the dumping mechanism and trip. Fig. 3 shows in detail the parts for coupling the rake-head to the rotating axle. Fig. 4 is a side elevation of the pawl-bracket, pawl, and spring; and Fig. 5 is a plan view of the yoke attached to the shafts and the parts on the axle in connection with which said yoke operates for preventing lateral play or movement of the shafts.

A represents the axle on the ends of which the driving-wheels B and B' are mounted, said wheels being connected with the axle for rotating it in the forward movement of the machine by "backing-ratchets," in a manner well understood.

C C represent the thills, which are connected by transverse bars C' C², to form a frame or draft attachment upon which the seat and foot and hand levers for controlling the rake are supported and arranged in any usual or suitable manner, said thills being connected at their rear ends with the axle A by means of suitable bearing-brackets, $c\ c'$, in which the axle can rotate freely. The transverse bars C' C² have secured to them, near the center of their length, a longitudinal bar, D, to the rear end of which is secured a yoke or U-shaped bracket, D', the two arms of which are provided with sleeves or half-sleeves $d\ d'$, surrounding or partly surrounding and resting upon the axle A, embracing between them the rake-dumping mechanism, as will be explained, and rake-head-supporting brackets F' and F².

E represents the rake-head, which, with the teeth, may be of any usual or preferred construction, and which is connected with the axle A by means of pendent brackets F, F', F², and F³, rigidly secured to the rake-head, and provided at their lower ends with eye or sleeve bearings, in which the axle rotates freely.

Between the brackets F' and F² the axle A has keyed or otherwise rigidly secured to it a wheel or disk, G, which is provided at its periphery with a laterally-projecting rim or annular flange, $g$, having ratchet-teeth $g'$ formed on its inner face, as shown in Fig. 3, with which a pawl, $h$, pivoted to the inner face of the bracket F', is adapted to be engaged, for coupling the rake-head to and causing it to be rocked by the revolving axle for discharging the load, in a manner well understood. The pawl $h$ is pivoted to a lug, $f'$, formed on one side of the sleeve-bearing $f$ of bracket F', and is provided with a curved heel-extension, $h'$, beyond its pivot, from which a spring, $i$, extends into a pocket at I, formed upon or secured to the bracket F', said spring serving by its tension to force the pawl inward away from the teeth $g'$. The bracket F' has a laterally-projecting curved flange, $f^2$, which partially surrounds the open end of the annular flange or rim $g$, the bracket and flange $f^2$ serving to close in and protect the ratchet-teeth, pawl, and spring from dirt or other obstructing matter. The pawl $h$ has a lever-arm, H, formed upon one side of it, which projects through an opening in the flange $f^2$, beyond the periphery of the wheel G, and has a chain or cord, $k$, attached to it, which extends forward and is attached at its forward end to the seat-supporting standard K, or other suitable point of the shaft-frame, in convenient position to be acted upon by the driver's foot, who by pressing upon said cord or chain can overcome the tension of spring $i$ and draw the pawl into engagement with the teeth $g'$ of wheel G, for causing the rake to be rocked upward to discharge its load. The lever H is of sufficient length to cause it, after the rake has been elevated to the desired height to cause the discharge of its load, to come in contact with the yoke or U-shaped bracket D', which serves to throw the pawl $h$ out of engagement with the wheel G, allowing the rake by its gravity to drop back again into position for gathering a new load. The brackets F' and F², as explained, are fast on the rake-head, and abut one against the sleeve $d$, and the other against the sleeve $d'$, of the yoke D', which is rigidly secured to the draft-frame or thills, as explained, and the wheel G, with its flange $g$ and hub $g^2$, fill in snugly the space between said brackets, and, being fast on the axle, it will be seen that lateral play or movement of the shafts on the axle or of the rake-head relatively to either the shafts or axle is effectually prevented. A hand-lever is shown at L, which may be connected with the rake-head in any usual or preferred manner for adapting the latter to be rocked by hand when desired.

Parts of the rake not particularly described may be constructed in any usual manner.

Having now described my invention, I claim as new—

1. The combination, in a horse hay-rake, of the rocking rake-head, the internally-ratcheted rim fast on the axle, the pawl located within said rim and pivotally connected with the rake-head, and the spring for retracting the pawl and holding it out of engagement with the ratcheted rim, said spring being also located within the ratcheted rim, substantially as shown and described.

2. The combination of the yoke or U-shaped bracket secured to the draft-frame, the rake-head-supporting brackets fast on the rake-head and surrounding the axle between the arms of the U-shaped thill bracket or yoke, and the interposed ratchet disk or wheel fast on the rotating axle, substantially as described, for preventing relative lateral play or movement of the thills and axle.

3. The yoke or U-shaped bracket fast on the draft-frame or thills, in combination with the supporting-brackets fast on the rocking rake-head, the internally-ratcheted wheel fast on the axle between said rake-head brackets, the pawl pivoted to the rake-head and adapted to engage said ratchet-wheel, and the lever connected to said pawl and adapted to be operated to release the pawl by coming in contact with the yoke or U-shaped thill-bracket, substantially as described.

In testimony whereof I have hereunto set my hand this 28th day of May, A. D. 1884.

J. H. THOMAS.

Witnesses:
H. B. ZEVELY,
REX. M. SMITH.